(12) United States Patent
Wonnemann et al.

(10) Patent No.: US 10,421,879 B2
(45) Date of Patent: Sep. 24, 2019

(54) MULTILAYER COATING WITH A PRIMER-SURFACER OF A NONAQUEOUS COATING MATERIAL COMPRISING AT LEAST TWO DIFFERENT POLYESTERS

(71) Applicant: BASF Coatings GmbH, Münster (DE)

(72) Inventors: Heinrich Wonnemann, Telgte (DE);
Markus Oberhoff, Drensteinfurt (DE);
Martin Rieping, Drensteinfurt (DE);
Beate Podlaski-Pyzik, Münster (DE);
Carole Morcillo Ruiz, Lamorlaye (FR);
Michael Hartung, Geseke (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 14/379,912

(22) PCT Filed: Feb. 20, 2013

(86) PCT No.: PCT/EP2013/053386
§ 371 (c)(1),
(2) Date: Aug. 20, 2014

(87) PCT Pub. No.: WO2013/124322
PCT Pub. Date: Aug. 29, 2013

(65) Prior Publication Data
US 2016/0017176 A1 Jan. 21, 2016

Related U.S. Application Data

(60) Provisional application No. 61/601,054, filed on Feb. 21, 2012.

(30) Foreign Application Priority Data

Feb. 21, 2012 (EP) .................................... 12156356

(51) Int. Cl.
*C09D 167/02* (2006.01)
*B05D 7/00* (2006.01)
(Continued)

(52) U.S. Cl.
CPC ............ *C09D 167/02* (2013.01); *B05D 1/02* (2013.01); *B05D 7/14* (2013.01); *B05D 7/57* (2013.01); *B05D 7/576* (2013.01); *C09D 167/00* (2013.01); *B05D 3/02* (2013.01); *B05D 7/24* (2013.01); *B05D 7/53* (2013.01); *B05D 7/56* (2013.01); *B05D 7/574* (2013.01); *B05D 7/577* (2013.01); *B05D 2202/00* (2013.01); *B05D 2401/10* (2013.01); *B05D 2504/00* (2013.01); *B05D 2508/00* (2013.01); *B05D 2601/00* (2013.01); *B05D 2601/02* (2013.01); *B05D 2601/04* (2013.01); *B05D 2601/20* (2013.01); *B05D 2601/22* (2013.01); *B05D 2601/24* (2013.01); *B32B 15/04* (2013.01); *B32B 15/08* (2013.01); *B32B 15/09* (2013.01); *B32B 15/092* (2013.01); *B32B 15/098*
(2013.01); *B32B 27/36* (2013.01); *B32B 2255/06* (2013.01); *B32B 2255/26* (2013.01); *B32B 2255/28* (2013.01); *B32B 2605/00* (2013.01); *C08K 3/013* (2018.01); *C08K 3/04* (2013.01); *C08K 3/22* (2013.01); *C08K 3/26* (2013.01); *C08K 3/30* (2013.01); *C08K 3/34* (2013.01); *C08K 3/36* (2013.01); *C08K 5/29* (2013.01); *C08K 2003/2224* (2013.01); *C08K 2003/2227* (2013.01); *C08K 2003/2241* (2013.01);
(Continued)

(58) Field of Classification Search
None
See application file for complete search history.

(56) References Cited

U.S. PATENT DOCUMENTS 4,205,115 A * 5/1980 Piccirilli ............ C08G 18/4205
428/334
4,217,440 A * 8/1980 Barkey .................. C08G 63/78
528/274
(Continued)

FOREIGN PATENT DOCUMENTS

DE 10-2008-016050 * 6/2009
EP 0250052 12/1987
(Continued)

OTHER PUBLICATIONS

"Glass Transition Temperature in Polymer Blends". Advances in Polymer Technology, vol. 5, No. 1 (1985).*
(Continued)

*Primary Examiner* — Vivian Chen
(74) *Attorney, Agent, or Firm* — Servilla Whitney LLC

(57) ABSTRACT

Method for producing a multicoat coating comprises: applying a primer-surfacer coat (I) to an optionally pretreated substrate, curing coat (I), applying a basecoat (II) to coat (I), optionally curing the basecoat (II), applying a clearcoat (III) to basecoat (II), and curing basecoat (II) and/or clearcoat (III), wherein coat (I) is obtained by applying a nonaqueous, solventborne coating material comprising by weight: at least 20% of at least one organic solvent, at least 8% of at least one first polyester (A1), having a glass transition temperature of at least 20° C. and an acid number of 0 to 40 mg KOH/g; at least 8% by weight of at least one second polyester (A2), different from (A1) and having a glass transition temperature of not more than 10° C.; at least one crosslinker (B); and at least 8% of one or more fillers and/or pigments (C).

20 Claims, No Drawings

(51) Int. Cl.

| | | |
|---|---|---|
| C09D 167/00 | (2006.01) | |
| B05D 7/14 | (2006.01) | |
| B05D 1/02 | (2006.01) | |
| B32B 15/09 | (2006.01) | |
| B32B 15/092 | (2006.01) | |
| B32B 27/36 | (2006.01) | |
| B32B 15/08 | (2006.01) | |
| B32B 15/04 | (2006.01) | |
| B32B 15/098 | (2006.01) | |
| B05D 7/24 | (2006.01) | |
| B05D 3/02 | (2006.01) | |
| C09D 7/20 | (2018.01) | |
| C09D 5/08 | (2006.01) | |
| C09D 161/28 | (2006.01) | |
| C09D 163/00 | (2006.01) | |
| C09D 161/00 | (2006.01) | |
| C09D 5/00 | (2006.01) | |
| C09D 161/26 | (2006.01) | |
| C09D 7/65 | (2018.01) | |
| C09D 7/61 | (2018.01) | |
| C09D 167/03 | (2006.01) | |
| C08L 61/26 | (2006.01) | |
| C08L 63/00 | (2006.01) | |
| C08L 67/03 | (2006.01) | |
| C08L 67/00 | (2006.01) | |
| C08L 61/28 | (2006.01) | |
| C08L 61/00 | (2006.01) | |
| C08L 67/02 | (2006.01) | |
| C08K 3/26 | (2006.01) | |
| C08K 5/29 | (2006.01) | |
| C08K 3/22 | (2006.01) | |
| C08K 3/013 | (2018.01) | |
| C08K 3/36 | (2006.01) | |
| C08K 3/04 | (2006.01) | |
| C08K 3/30 | (2006.01) | |
| C08K 3/34 | (2006.01) | |

(52) U.S. Cl.
CPC .. *C08K 2003/262* (2013.01); *C08K 2003/265* (2013.01); *C08K 2003/267* (2013.01); *C08K 2003/3045* (2013.01); *C08L 61/00* (2013.01); *C08L 61/26* (2013.01); *C08L 61/28* (2013.01); *C08L 63/00* (2013.01); *C08L 67/00* (2013.01); *C08L 67/02* (2013.01); *C08L 67/03* (2013.01); *C09D 5/00* (2013.01); *C09D 5/002* (2013.01); *C09D 5/08* (2013.01); *C09D 7/20* (2018.01); *C09D 7/61* (2018.01); *C09D 7/65* (2018.01); *C09D 161/00* (2013.01); *C09D 161/26* (2013.01); *C09D 161/28* (2013.01); *C09D 163/00* (2013.01); *C09D 167/03* (2013.01); *Y10T 428/31681* (2015.04); *Y10T 428/31786* (2015.04)

(56) References Cited

U.S. PATENT DOCUMENTS

| | | | | | |
|---|---|---|---|---|---|
| 4,752,532 | A | * | 6/1988 | Starka | C09D 167/00 428/423.7 |
| 4,789,707 | A | * | 12/1988 | Nishimura | C09D 161/20 525/157 |
| 5,739,204 | A | * | 4/1998 | Piana | C09D 167/00 524/379 |
| 5,849,825 | A | * | 12/1998 | Renz | C09D 5/38 524/376 |
| 5,972,425 | A | * | 10/1999 | Nishi | B05D 7/57 427/195 |
| 6,200,683 | B1 | * | 3/2001 | Montague | C09D 167/00 428/430 |
| 6,270,855 | B1 | * | 8/2001 | Jung | B05D 1/265 427/482 |
| 6,355,306 | B1 | * | 3/2002 | Renz | C09D 5/38 427/407.1 |
| 6,413,648 | B1 | * | 7/2002 | Heyenk | C09D 167/00 428/413 |
| 6,517,695 | B1 | * | 2/2003 | Garner | C08G 18/8077 204/505 |
| 6,762,272 | B1 | * | 7/2004 | Ardaud | C08G 18/42 528/45 |
| 6,897,265 | B2 | * | 5/2005 | Algrim | C09D 167/00 525/437 |
| 6,946,515 | B1 | * | 9/2005 | Lettmann | C08G 18/0823 524/507 |
| 6,965,007 | B1 | * | 11/2005 | Charriere | C08G 18/8096 252/182.2 |
| 7,071,267 | B2 | * | 7/2006 | Algrim | C09D 167/00 525/437 |
| 7,754,827 | B2 | * | 7/2010 | Weikard | C08G 18/022 525/452 |
| 9,187,673 | B2 | * | 11/2015 | Hayes | C09D 167/06 |
| 2003/0181590 | A1 | * | 9/2003 | Lettmann | C09D 175/06 525/165 |
| 2004/0081850 | A1 | * | 4/2004 | Algrim | C09D 167/00 428/689 |
| 2004/0082733 | A1 | * | 4/2004 | Algrim | C09D 167/00 525/437 |
| 2004/0249061 | A1 | * | 12/2004 | Sunkara | C08G 18/4063 524/589 |
| 2005/0085569 | A1 | * | 4/2005 | Yuan | C08G 18/4202 524/1 |
| 2006/0234404 | A1 | * | 10/2006 | December | G01N 3/42 438/14 |
| 2007/0066787 | A1 | * | 3/2007 | Ardaud | C08G 18/792 528/44 |
| 2007/0190258 | A1 | * | 8/2007 | Lewin | C08G 18/222 427/407.1 |
| 2007/0269661 | A1 | * | 11/2007 | Graham | C08G 18/6229 428/423.1 |
| 2010/0266758 | A1 | * | 10/2010 | Vaes | C08G 18/003 427/140 |
| 2010/0323103 | A1 | * | 12/2010 | Hintze-Bruning | B05D 5/00 427/126.3 |
| 2011/0052920 | A1 | * | 3/2011 | Yokoyama | C08L 67/00 428/414 |
| 2012/0034457 | A1 | * | 2/2012 | Low | C09D 133/08 428/336 |

FOREIGN PATENT DOCUMENTS

| | | |
|---|---|---|
| JP | 2007509202 A | 4/2007 |
| WO | WO-98/47974 | 10/1998 |
| WO | WO-2009/086034 | 7/2009 |

OTHER PUBLICATIONS

"Prediction of Glass Transition Temperatures: Binary Blends and Copolymers". Material Letters 62, p. 3152-3155 (2008).*
Miscible Polymer Blends (http://pslc.ws/macrog/blend.htm) (webpage retrieved Mar. 13, 2017).*
Polymer Architecture (https://en.wikipedia.org/wiki/Polymer_architecture) (webpage retrieved Mar. 13, 2017).*
PCT International Search Report in PCT/EP2013/053386, dated May 21, 2013, 3 pages.
PCT International Preliminary Report on Patentability in PCT/EP2013/053386, dated Sep. 4, 2014, 8 pages.

* cited by examiner

MULTILAYER COATING WITH A PRIMER-SURFACER OF A NONAQUEOUS COATING MATERIAL COMPRISING AT LEAST TWO DIFFERENT POLYESTERS

CROSS-REFERENCE TO RELATED APPLICATIONS

This application is the National Stage entry of PCT/EP2013/053386, filed on Feb. 20, 2013, which claims priority to European Application Number 12156356.3, filed on Feb. 21, 2012, and U.S. Ser. No. 61/601,054 filed on Feb. 21, 2012, which are incorporated herein by reference in their entireties.

FIELD OF THE INVENTION

The invention relates to a multicoat coating having a primer-surfacer coat made from a nonaqueous, solvent-based coating material based on polyester. The invention also relates to a method for producing the multicoat coating, and to substrates, more particularly automobile bodies, coated with the multicoat coating.

PRIOR ART

Nonaqueous solvent-based (i.e. "conventional") coating materials based on polyester are known for the production of finishes (coatings). In automotive OEM finishing and also in automotive refinish, multicoat coatings are commonly used that may consist, for example, of an electrocoat, a primer-surfacer coat, a basecoat and a clearcoat. The multicoat coating is subject to exacting requirements in relation, for example, to stonechip resistance and resistance to harmful substances such as bird droppings. The primer-surfacer coat in particular, as well as featuring good sandability, effective smoothing of the substrate (good filling capacity) and effective adhesion to the substrate and to overlying paint coats, must also contribute to very good stonechip resistance and high bird-dropping resistance.

As part of a multicoat coating, existing conventional primer-surfacer formulations, of the kind known, for example, from "Automotive Paints and Coatings" ("Primer Surfacer"; Streitberger and Dössel, Wiley-VCH 2008) do fulfill the customary stonechip protection specifications of the majority of motor-vehicle manufacturers, but do not at the same time meet the requirements in terms of bird-dropping resistance. Aggressive substances from bird droppings are able to penetrate the upper paint coats through to the primer-surfacer coat, and, with the existing, conventional primer-surfacer formulations, often lead to delamination between primer-surfacer coat and basecoat, and hence to the flaking of the paint.

SUMMARY

A problem addressed by the present invention, therefore, was that of providing a multicoat coating comprising a primer-surfacer coat, a basecoat and a clearcoat, that exhibits very good stonechip resistance and at the same time a high bird-dropping resistance.

The multicoat coating is to be suitable more particularly for automotive OEM finishing. In addition, the coating material from which the primer-surfacer coat is obtained is to have a sufficient shelf life.

DETAILED DESCRIPTION

The problem is surprisingly solved by a multicoat paint system obtainable by a production method comprising the steps of
i) applying a primer-surfacer coat (I) to an optionally pretreated substrate,
ii) curing the primer-surfacer coat (II),
iii) applying a basecoat (II) to the cured primer-surfacer coat (I),
iv) optionally curing the basecoat (II),
v) applying a clearcoat (III) to the cured or uncured basecoat (II), and
vi) curing the clearcoat (III) or the basecoat and the clearcoat if the basecoat was not cured in step iv),
where the primer-surfacer coat (I) is obtained by applying a nonaqueous, solventborne coating material (F) comprising
at least 20% by weight, based on the total coating material (F), of at least one organic solvent, and also
A1) at least 8% by weight, based on the total coating material (F), of at least one first polyester (A1), having a glass transition temperature of at least 20° C. and an acid number of 0 to 40 mg KOH/g,
A2) at least 8% by weight, based on the total coating material (F), of at least one second polyester (A2), different from (A1) and having a glass transition temperature of not more than 10° C.,
B) at least one crosslinker (B), and
C) at least 8% by weight, based on the total coating material (F), of one or more fillers and/or pigments (C).

The resultant multicoat coatings are suitable more particularly for automotive OEM finishing. A particular surprise was that the resulting multicoat coatings simultaneously have very good stonechip resistance and a high bird-dropping resistance. Also, furthermore, the shelf life of the coating materials (F) is sufficient.

The invention accordingly provides the above-outlined method for producing multicoat coatings, the multicoat coatings obtainable accordingly, and also substrates coated with these multicoat coatings.

Multicoat Coating

The multicoat coating comprises at least a primer-surfacer coat (I), a basecoat (II) and a clearcoat (III).

The primer-surfacer coat (I) is obtained by applying a nonaqueous, solventborne coating material (F), which is described in more detail later on below.

The basecoat (II) is obtained by applying a customary and known basecoat material. A basecoat material is a pigmented coating material which customarily comprises one or more binders, crosslinkers and pigments. Suitable basecoat materials are the customary pigmented basecoat materials used in automotive finishing. It is possible to use not only waterborne basecoat materials but also conventional, solventborne basecoat materials. The basecoat (II) is obtained preferably by applying a waterborne basecoat material.

The clearcoat (III) is obtained by applying a customary and known clearcoat material. A clearcoat material is a coating material which produces a transparent coating and which generally does not comprise any pigments or fillers, at most only dyes or very finely divided, transparent pigments. Both solventborne and aqueous clearcoat materials can be used. Both 1-component and multicomponent clearcoat materials can be used.

The basecoat (II) and the clearcoat (III) may be applied in accordance with the customary and known techniques, more particularly by spraying or squirting. Application takes place preferably at the layer thicknesses customary for automotive OEM finishing, such as, for example, 10 to 80 micrometers, more particularly 20 to 70 micrometers in terms of dry film thickness.

The basecoat (II) and the clearcoat (III) can be cured separately or jointly. Curing has no peculiarities in terms of technique, but may instead take place in accordance with the customary and known methods. For example, curing may take place thermally or with actinic radiation, or thermally and with actinic radiation. Where basecoat (II) and clearcoat (III) are cured jointly, the basecoat (II) can be flashed off by the customary methods prior to the application of the clearcoat (III), without complete curing of the basecoat (II).

Coating Material (F) and Primer-Surfacer Coat (I)

The primer-surfacer coat (I) is obtained by applying the nonaqueous, solventborne coating material (F) to an optionally pretreated substrate.

A nonaqueous coating material is a coating material which contains not more than 1% by weight of water, based on the total coating material.

The coating material (F) is solvent-based. This means that it contains at least 20% by weight, preferably at least 30% by weight, of at least one organic solvent, based in each case on the total coating material. In another embodiment of the present invention it is also possible for at least 40% by weight of organic solvents to be present, based on the total coating material. Suitable organic solvents are the customary organic solvents that are known and used in coating materials. Examples of highly suitable organic solvents include n- and isobutanol, butyl diglycol acetate, n-butyl acetate, solvent naphtha and xylene. It is also possible, for example, to use further aromatic hydrocarbons, isopropylbenzene, ethylbenzene, mesitylene, n-propylbenzene, 1,2,4-trimethylbenzene, cyclohexane, methanol, 2-butoxyethanol, distilled propylene carbonate, butyl glycol acetate, tosyl chloride, formaldehyde and/or naphthalene as organic solvents.

The solids of the coating material (F) is preferably 58-68%, more preferably 60-66%. For spray application the coating material (F) is then adjusted preferably to 5-16%, more preferably to 8-12%, with a suitable solvent. The solids can be adjusted by dilution with suitable organic solvents. The solids of the coating material is determined as the nonvolatile fraction (%) of a 1 g sample after heating at 105° C. for 180 minutes.

The glass transition temperature of the coating material (F), measured by DSC (Differential Scanning Calorimetry), is preferably at least 35° C., more preferably at least 40° C. The glass transition temperature is measured by DSC on a sample with an original wet film thickness of 50 micrometers, which was dried at 130° C. for 60 minutes. The dried film is first allowed to cool to room temperature. The film is then cooled to −80° C. in a DSC unit, heated from that level to +80° C., cooled to −80° C. again, and finally heated to +80° C. again. The heating and cooling rates are in each case 10° C. per minute. An evaluation is made of the midpoint of the second heating run, from which the glass transition temperature Tg can be read.

The requirements in terms of bird-dropping resistance are met particularly effectively when the glass transition temperature of the coating material (F) is correspondingly high.

The coating material (F) preferably has a weight ratio of fillers and/or pigments (C) to binders (A1, A2, B) of 0.5-1.2, more preferably of 0.7-0.9. It is calculated using the solids masses of A1, A2, B and C that are employed. The solids of A1, A2, B and C are determined in each case as nonvolatile fractions and are measured by the drying of an approximately 2 g sample on a lid which is heated in a forced-air oven at 130° C. for 60 minutes with addition of 2 ml of xylene.

The coating material (F) preferably has a weight ratio of polyester (A1) to polyester (A2) of 0.7 to 1.2, more preferably of 0.9 to 1.1. It is calculated using the solids masses of A1 and A2 that are employed. The solids of A1 and A2 are in each case determined as nonvolatile fractions and are measured by the drying of an approximately 2 g sample on a lid which is heated in a forced-air oven at 130° C. for 60 minutes with addition of 2 ml of xylene.

Polyester (A1) (with High Glass Transition Temperature)

The coating material (F) comprises at least 8% by weight, based on the total coating material, of at least one first polyester (A1) having a glass transition temperature, measured by DSC, of at least 20° C. Suitable polyesters (A1) may be obtained, for example, from the reaction of diols and/or polyols with dicarboxylic and/or polycarboxylic acids. Mixtures of one or more diols and/or polyols and one or more dicarboxylic and/or polycarboxylic acids may also be used. In place of the dicarboxylic and/or polycarboxylic acids it is also possible to use their anhydrides or their esters with volatile alcohols (more particularly dimethyl terephthalate). In addition it is also possible to use fractions of monocarboxylic acids and/or monoalcohols.

Suitable diols are, for example, linear, cyclic and/or branched alkanediols having 2 to 22 carbon atoms and primary and/or secondary hydroxyl groups, such as, for example, ethylene glycol, 1,2-propanediol (propylene glycol), 1,3-propanediol, 1,2-butanediol, 1,3-butanediol, 1,4-butanediol, 1,2-pentanediol, 1,3-pentanediol, 1,4-pentanediol, 1,5-pentanediol, 1-methyl-2,3-propanediol, neopentyl glycol, 1,6-hexanediol, 1,4-cyclohexanedimethanol (optionally in a mixture with its 1,3 isomer), tricyclodecanedimethanol (TCD Alcohol DM), and also other linear, cyclic and/or branched alkanediols; dihydroxy-functional ethers such as, for example, diethylene glycol, triethylene glycol, other polyethylene glycols, dipropylene glycol, tripropylene glycol, other polypropylene glycols, or mixed polyethylene-polypropylene glycols with aromatic structural units, such as, for example, bisphenol A or bisphenol F; dihydroxy-functional esters such as, for example, neopentyl glycol ester of hydroxypivaloyl acid; and also glycidyl esters of branched monocarboxylic acids, e.g. of Versatic acid.

Diols preferred among these are cyclic and branched diols having preferably 3 to 14 carbon atoms. Particularly preferred diols are the neopentyl glycol ester of hydroxypivaloyl acid, and neopentyl glycol.

Suitable polyols are, for example, triols such as, for example, trimethylolpropane, trimethylolethane or glycerol, and also alcohols of higher hydricity, such as pentaerythritol, for example.

Suitable dicarboxylic acids are, for example, saturated or unsaturated, linear or branched, cycloaliphatic or aliphatic dicarboxylic acids having 3 to 22 carbon atoms, and also aromatic dicarboxylic acids, such as, for example, adipic acid, sebacic acid, alkenylsuccinic acids such as, for example, tetrapropenylsuccinic acid, dodecenylsuccinic acid, phthalic acid, isophthalic acid, tetrahydrophthalic acid, hexahydrophthalic acid or terephthalic acid. It is also possible to use the respective anhydrides, in other words, for example, phthalic anhydride, tetrapropenylsuccinic anhydride, dodecenylsuccinic anhydride, tetrahydrophthalic anhydride or hexahydrophthalic anhydride.

It is preferred to use only a small fraction of linear aliphatic dicarboxylic acids, preferably 0%-5% by weight, based on the total dicarboxylic and/or polycarboxylic acids used for preparing the polyester (A1). It is particularly preferred not to use any linear aliphatic dicarboxylic acids for preparing the polyester (A1).

Preferred dicarboxylic acids and their anhydrides are cycloaliphatic and aromatic dicarboxylic acids, such as, for example, phthalic acid, phthalic anhydride, isophthalic acid, tetrahydrophthalic acid, tetrahydrophthalic anhydride or terephthalic acid. Particularly preferred dicarboxylic acids and their anhydrides are phthalic anhydride, isophthalic acid and tetrahydrophthalic anhydride.

Suitable polycarboxylic acids are, for example, trimellitic acid and other polycarboxylic acids. It is also possible to use the respective anhydrides, in other words, for example, trimellitic anhydride. Preferred polycarboxylic acids and their anhydrides are trimellitic acid and trimellitic anhydride.

The reaction of the diols and/or polyols with the dicarboxylic and/or polycarboxylic acids for preparing a polyester (A1) may take place in one stage or else in two or more stages. Particularly preferred polyesters (A1) are obtained from the reaction of the neopentyl glycol ester of hydroxypivaloyl acid, neopentyl glycol, isophthalic acid and tetrahydrophthalic anhydride, and subsequent reaction of the product with trimellitic anhydride and phthalic anhydride.

The polyesters (A1) contain functional groups which are able to enter into a crosslinking reaction with the crosslinker molecules (B). These groups include more particularly isocyanate-reactive groups, and also groups reactive with amino resins. Suitable functional groups are, for example, hydroxyl groups, epoxy groups, carboxyl groups, amino groups and urea groups. Preferred functional groups of the polyester (A1) are hydroxyl groups.

The polyesters (A1) preferably have a hydroxyl number of 50 to 150 mg KOH/g, more preferably of 80 to 120 mg KOH/g, based in each case on the solids (nonvolatile fraction) of the respective polyester (A1), which is determined after drying at 130° C. for 60 minutes.

The polyesters (A1) have an acid number of 0 to 40 mg KOH/g, preferably of 5 to 30 mg KOH/g, more preferably of 0 to 25 mg KOH/g, based in each case on the solids (nonvolatile fraction) of the respective polyester (A1), which is determined after drying at 130° C. for 60 minutes. If the acid number of the polyester or polyesters (A1) used is too high, a sufficient shelf life for the coating material is no longer ensured. In the context of the present invention, the acid number is determined in accordance with DIN EN ISO 3682.

The number-average molecular weight (Mn) of the first polyester (A1) is preferably between 1000 g/mol and 10 000 g/mol, more preferably between 1000 g/mol and 5000 g/mol.

The weight-average molecular weight (Mw) of the first polyester (A1) is preferably between 1000 g/mol and 50 000 g/mol, more preferably between 2500 g/mol and 15 000 g/mol.

The polydispersity (Mw/Mn) of the first polyester (A1) is preferably 5 or below, more preferably 3.5 or below.

The number-average and weight-average molecular weights are determined by means of gel permeation chromatography in accordance with DIN 55672-1 (2007-08 edition) for THF-soluble polymers using tetrahydrofuran (+0.1% acetic acid) as eluent on a styrene-divinylbenzene column combination (Waters HR4, HR3, HR2). Calibration takes place by means of polystyrene standards.

The glass transition temperature of the first polyester (A1), measured by DSC, is at least 20° C., preferably at least 25° C.

The coating material (F) contains preferably at least 9% by weight, more particularly at least 10% by weight, based on the total coating material (F), of the at least one polyester (A1). The maximum weight fraction of the polyester (A1) is limited ultimately by the amount of the other components present in the coating material. The weight fraction of the polyester (A1) is, for example, below 30% by weight, with more particular preference below 20% by weight.

With particular preference the coating material (F) contains at least 9% by weight, more particularly at least 10% by weight, based on the total coating material (F), of at least one polyester (A1) having a glass transition temperature, measured by DSC, of at least 20° C., very preferably of at least 25° C.

Polyester (A2) (with Lower Glass Transition Temperature)

The coating material (F) further comprises at least 8% by weight, based on the total coating material (F), of at least one second polyester (A2), which is different from the polyester (A1) and has a glass transition temperature, measured by DSC, of not more than 10° C. Suitable polyesters (A2) may be obtained, for example, from the reaction of diols and/or polyols with dicarboxylic and/or polycarboxylic acids. Mixtures of one or more diols and/or polyols and one or more dicarboxylic and/or polycarboxylic acids may also be used. In addition it is also possible to use fractions of monocarboxylic acids and/or monoalcohols.

Suitable diols are, for example, linear, cyclic and/or branched alkanediols having preferably 2 to 14 carbon atoms and primary and/or secondary hydroxyl groups, such as, for example, ethylene glycol, 1,2-propanediol (propylene glycol), 1,3-propanediol, 1,2-butanediol, 1,3-butanediol, 1,4-butanediol, 1,2-pentanediol, 1,3-pentanediol, 1,4-pentanediol, 1,5-pentanediol, neopentyl glycol, 1,6-hexanediol, 1,4-cyclohexanedimethanol (optionally in a mixture with further isomers), and also other linear, cyclic and/or branched alkanediols; dihydroxy-functional ethers such as, for example, diethylene glycol, triethylene glycol, other polyethylene glycols, dipropylene glycol, tripropylene glycol, other polypropylene glycols, or mixed polyethylene-polypropylene glycols or polyglycols with aromatic structural units, such as, for example, bisphenol A or bisphenol F; dihydroxy-functional esters such as, for example, neopentyl glycol ester of hydroxypivaloyl acid; and also "dimer diols", which are produced by reduction of dimerized fatty acids (e.g. Pripol® 2033 from Uniqema).

Diols preferred among these are linear, cyclic and/or branched alkanediols having 4-8 carbon atoms, such as, for example, neopentyl glycol or 1,4-cyclohexanediol, and also polyglycols having aromatic structural units, such as, for example, ethoxylated bisphenol A derivatives (e.g. Pluriol® BP40/Dianol® 240, an adduct of 4 mol of ethylene oxide with bisphenol A).

Particularly preferred diols are neopentyl glycol and ethoxylated bisphenol A derivatives.

Suitable polyols are, for example, triols such as, for example, trimethylolpropane, trimethylolethane or glycerol, and also alcohols of higher hydricity, such as pentaerythritol, for example. A preferred polyol is trimethylolpropane.

Suitable dicarboxylic acids are, for example, saturated or unsaturated, linear or branched, cycloaliphatic or aliphatic dicarboxylic acids having 3 to 22 carbon atoms, and also aromatic dicarboxylic acids, such as, for example, adipic acid, sebacic acid, phthalic acid, isophthalic acid, tetrahydrophthalic acid or terephthalic acid; and also plant-based or animal-based dimer fatty acids, which may be modified by hydrogenation of unsaturated bonds and/or may be purified by distillation, such as, for example, Pripol®1010, Pripol®1012 or Pripol®1022. It is also possible to use the respective anhydrides, in other words, for example, phthalic anhydride, isophthalic anhydride or tetrahydrophthalic anhydride. Preferred dicarboxylic acids and their anhydrides are cycloaliphatic and aromatic dicarboxylic acids such as phthalic acid, phthalic anhydride, isophthalic acid, isophthalic anhydride, tetrahydrophthalic acid, tetrahydrophthalic anhydride, terephthalic acid or terephthalic anhydride. Particularly preferred dicarboxylic acids are their anhydrides are phthalic acid, phthalic anhydride, isophthalic acid, isophthalic anhydride, tetrahydrophthalic acid and tetrahydrophthalic anhydride.

A suitable polycarboxylic acid is, for example, trimellitic acid. It is also possible to use the respective anhydrides, in other words, for example, trimellitic anhydride.

The reaction of the diols and/or polyols with the dicarboxylic and/or polycarboxylic acids for preparing a polyester (A2) may take place in one stage or else in two or more stages. Particularly preferred polyesters (A2) are obtained from the reaction of ethoxylated bisphenol A derivatives (e.g. obtainable under the trade name Pluriol® BP40E from BASF SE), neopentyl glycol and trimethylolpropane with adipic acid and trimellitic anhydride. The polyesters (A2) may additionally be modified in a subsequent step by addition reaction with lactones, more particularly caprolactone. This typically results in a lowered glass transition temperature (Tg) for the polyesters.

The polyesters (A2) contain functional groups which are able to enter into a crosslinking reaction with the crosslinker molecules (B). These groups include more particularly isocyanate-reactive groups, and also groups reactive with amino resins. Suitable functional groups are, for example, hydroxyl groups, epoxy groups, carboxyl groups, amino groups or urea groups. Preferred functional groups of the polyester (A2) are hydroxyl groups.

The polyesters (A2) preferably have a hydroxyl number of 60 to 130 mg KOH/g, more preferably of 70 to 110 mg KOH/g, very preferably of 80 to 100 mg KOH/g, based in each case on the solids (nonvolatile fraction) of the respective polyester (A2), which is determined after drying at 130° C. for 60 minutes.

The polyesters (A2) preferably have an acid number of between 5 and 50 mg KOH/g, very preferably of between 5 and 20 mg KOH/g, based in each case on the solids (nonvolatile fraction) of the respective polyester (A2), which is determined after drying at 130° C. for 60 minutes. If the acid number of the polyester or polyesters (A2) used is too high, a sufficient shelf life for the coating material is no longer ensured.

The number-average molecular weight (Mn) of the second polyester (A2) is preferably between 1000 g/mol and 10 000 g/mol, more preferably between 1000 g/mol and 5000 g/mol.

The weight-average molecular weight (Mw) of the second polyester (A2) is preferably between 5000 g/mol and 80 000 g/mol, more preferably between 10 000 g/mol and 60 000 g/mol.

The polydispersity (Mw/Mn) of the second polyester (A2) is preferably 5 or above, more preferably 8 or above.

The number-average and weight-average molecular weights are determined by means of gel permeation chromatography in accordance with DIN 55672-1 (2007-08 edition) for THF-soluble polymers using tetrahydrofuran (+0.1% acetic acid) as eluent on a styrene-divinylbenzene column combination (Waters HR4, HR3, HR2). Calibration takes place by means of polystyrene standards.

The coating material (F) contains preferably at least 9% by weight based on the total coating material, of the at least one polyester (A2). The maximum weight fraction of the polyester (A2) is limited ultimately by the amount of the other components present in the coating material. The weight fraction of the polyester (A2) is, for example, below 30% by weight, with more particular preference below 20% by weight.

The glass transition temperature of the second polyester (A2), measured by DSC, is different from the glass transition temperature of the first polyester (A1) and is not more than 10° C., preferably not more than 0° C. and very preferably not more than −10° C.

If the glass transition temperature of the second polyester (A2) is too high, the requirements in relation to stonechip resistance are no longer met.

Crosslinker (B)

The coating material (F) further comprises at least one crosslinker (B). Suitable crosslinkers (B) are all crosslinkers which are able to enter into a crosslinking reaction with functional groups of the polyesters. The crosslinker or crosslinkers (B) are preferably selected from the group consisting of blocked polyisocyanates and amino resins.

Blocked polyisocyanates are compounds having two or more isocyanate groups per molecule, their isocyanate groups having been reacted with customary and known blocking agents. The blocking agents are eliminated again only at elevated temperature, freeing up the isocyanate groups for a crosslinking reaction.

Amino resins are polycondensation resins formed from formaldehyde and compounds having primary and/or secondary amino groups, more particularly melamine-formaldehyde resins, benzoguanamine-formaldehyde resins and urea-formaldehyde resins.

The coating material (F) preferably comprises a combination of at least two different crosslinkers (B), including preferably at least one blocked polyisocyanate and at least one amino resin.

Suitable blocked polyisocyanates are, for example, aliphatic, cycloaliphatic, araliphatic and aromatic blocked polyisocyanates. They may be obtained, for example, from the reaction of hexamethylene diisocyanate (HDI), dimerized or trimerized HDI, isophorone diisocyanate (IPDI), tolylene diisocyanate (TDI), diphenylmethane diisocyanate (MDI), hydrogenated MDI ($H_{12}$MDI) or xylylene diisocyanate (XDI), with suitable blocking agents, such as, for example, phenols, lactams, CH-acidic compounds or oximes. Preferred blocking agents are methyl ethyl ketoxime, N-hydroxyphthalimide, 1,2,4-triazole, caprolactam, diethyl malonate and 3,5-dimethylpyrazole. A particularly preferred blocking agent is methyl ethyl ketoxime. It is preferred to use blocked polyisocyanates having 2 to 5 isocyanate groups per molecule.

Particularly preferred among the blocked polyisocyanates are aliphatic blocked polyisocyanates, more particularly those based on HDI and IPDI. Especially preferred are aliphatic blocked polyisocyanates based on IPDI. They are available commercially, for example, under the name Desmodur® BL 4265.

Suitable amino resins are, for example, melamine-formaldehyde resins, benzoguanamine-formaldehyde resins and/or urea-formaldehyde resins, the methylol groups of these resins being free or possibly having been partly or wholly etherified. Suitability for the etherification is possessed by, for example, short-chain alkanols such as methanol, ethanol, propanol, n-butanol or isobutanol, more particularly methanol or n-butanol.

Among the amino resins, melamine-formaldehyde and benzoguanamine-formaldehyde resins are preferred. Particularly preferred are melamine-formaldehyde resins partly etherified with methanol (e.g. Resimene® HM 2608), melamine-formaldehyde resins partly etherified with n-butanol (e.g. Luwipal® 018 BX) and benzo-guanamine-formaldehyde resins etherified with n-butanol (e.g. Luwipal® B 017).

The coating material (F) contains preferably 5% to 15% by weight, based on the total coating material, of the at least one crosslinker (B). It is further preferred if the coating material (F) contains 25% to 75% by weight, more particularly 35% to 60% by weight, based in each case on the sum of the solids of the binders (A1) and (A2), of one or more crosslinkers (B). Preferred among these is a combination of at least one blocked polyisocyanate with at least one amino resin as crosslinker (B). The weight ratio between blocked polyisocyanate and amino resin is preferably 0.5 to 1.5, more preferably 0.8 to 1.2. In another embodiment of the present invention, the coating material (F) contains 25% to 35% by weight, based on the sum of the solids of the binders (A1) and (A2), of one or more crosslinkers. In this embodiment as well a combination of at least one blocked polyisocyanate with at least one amino resin is preferred as crosslinker (B), with the weight ratio between blocked polyisocyanate and amino resin being preferably 0.5 to 1.5, more preferably 0.8 to 1.2.

Fillers and/or Pigments (C)

The coating material (F) is a primer-surfacer composition.

The coating material (F) comprises at least 8% by weight, based on the total coating material (F), of one or more fillers and/or pigments (C). The coating material (F) preferably contains at least 11% by weight, more preferably at least 15% by weight, based in each case on the total coating material (F), of one or more fillers and/or pigments (C). The maximum weight fraction of the fillers and/or pigments (C) is limited ultimately by the amount of the other components present in the coating material. The weight fraction is, for example, below 40% by weight, with more particular preference below 30% by weight.

The coating material (F) preferably has a weight ratio of fillers and/or pigments (C) to binders (A1, A2, B) of 0.5-1.2, more preferably of 0.7-0.9. It is calculated using the solids masses of A1, A2, B and C that are employed. The solids of A1, A2, B and C are determined in each case as nonvolatile fractions and are measured by the drying of an approximately 2 g sample on a lid which is heated in a forced-air oven at 130° C. for 60 minutes with addition of 2 ml of xylene.

Suitable fillers and/or pigments (C) are ultimately all of the fillers and/or pigments known in this context to the skilled person, examples being those from the group consisting of

- silicates such as, for example, magnesium silicate hydrates (e.g. talc), aluminum silicate hydrates (e.g. kaolin, China clay) and potassium aluminum silicate hydrates (e.g. muscovite/mica),
- calcium carbonates (e.g. chalk, calcite, marble),
- calcium magnesium carbonates (e.g. dolomite),
- barium carbonate,
- barium sulfates (e.g. Blanc fixe, barite, heavy spar),
- calcium sulfate,
- aluminum hydroxide, magnesium hydroxide,
- carbon black,
- titanium dioxide and
- silicas (e.g. quartz, Aerosil)

suitably.

Preferred fillers and/or pigments among these are silicas (e.g. Aerosil), titanium dioxide and Blanc fixe. Particularly preferred fillers and/or pigments among these are silicas and Blanc fixe.

Other Constituents

The coating material (F) may further comprise other customary coatings constituents (D) different from constituents (A1), (A2), (B) and (C), in customary coatings amounts, these being known to the skilled person. Examples of suitable other, customary coatings constituents (D) are other binders different from (A1) and (A2), color and/or effect pigments that are different from (C), reactive diluents that are curable thermally and/or both thermally and with actinic radiation, UV absorbers, light stabilizers, radical scavengers, crosslinking catalysts, deaerating agents, slip additives, defoamers, emulsifiers, wetting agents, dispersants, adhesion promoters, flow control agents, sag control agents (SCAs), rheological assistants, flame retardants, siccatives and corrosion inhibitors.

Preparation of the Coating Material (F) and Production of the Primer-Surfacer Coat (I)

The preparation of the coating material (F) has no peculiarities but can instead take place by mixing of the constituents in accordance with the customary and known techniques.

The shelf life of the coating material (F) is preferably such that on storage at 40° C. for 4 weeks the viscosity climbs to not more than twice the original value as determined immediately after preparation. The viscosity is measured using an Afnor flow cup (4 mm) at 23° C. (reported in seconds).

For producing the primer-surfacer coat (I), the coating material (F) is applied to an optionally pretreated substrate. The pretreatment may conform to the customary and known measures of surface pretreatments for substrates that are to be coated, such as cleaning, activating and/or precoating. The substrate, for example, may be precoated with an electrocoat. The substrate is preferably a metallic substrate, more preferably an automobile body or part thereof.

The application of the coating material (F) to the substrate may take place with the customary and known application techniques, such as spraying, for example. The coating material is preferably applied to the substrate by spraying.

The coating material (F) may be applied in the customary and known film thicknesses to the substrate, preferably such as to result in a dry film thickness of 30-60 micrometers, more preferably of 35-50 micrometers.

The curing of the coating material (F) on the substrate likewise has no peculiarities in terms of its method, but may instead take place in accordance with the customary and known techniques. The coating material (F), for example, is cured thermally. Prior to curing, the coating material (F) may be flashed off preferably briefly. Flashing may take place, for example, at room temperature for a number of minutes.

The invention is illustrated below by examples, without any intention that the subject matter of the invention should be restricted to the examples.

EXAMPLES

Measurement Methods:

The viscosity is measured, unless otherwise indicated, using a Cap2000 viscometer from Brookfield, which is equipped with a CAP-03 spindle, measurement taking place at 23° C. with a shear rate of 5000 s$^{-1}$ (unless indicated otherwise).

The nonvolatile fractions (NVF) of the individual polyesters (A1) and (A2) and of the fillers and/or pigments (C)

are measured by the drying of an approximately 2 g sample on a lid which is heated in a forced-air oven at 130° C. for 60 minutes with addition of 2 ml of xylene.

The solids of the coating material is determined as the nonvolatile fraction (in %) of a 1 g sample after heating at 105° C. for 180 minutes.

The glass transition temperature (Tg) is measured, as already described above, by DSC. The measuring conditions for determining the Tg of the coating material (F) have already been described earlier on above. For determining the Tg of binders, in other words more particularly of the polyesters (A1) and (A2), the procedure is as follows. The Tg is determined in a method based on DIN 51005 "Thermal Analysis (TA)—Terms" and DIN 53765 "Thermal Analysis—Dynamic Scanning Calorimetry (DSC)". In this method, a sample of 10 mg is weighed out into a sample pan and introduced into a DSC instrument. It is cooled to the starting temperature and then a 1st and 2nd measurement run is conducted, with an inert gas flush ($N_2$) of 50 ml/min, with a heating rate of 10 K/min, with cooling again to the starting temperature between the measurement runs. Measurement takes place typically in the temperature range from about 50° C. lower than the anticipated glass transition temperature to about 50° C. higher than the glass transition temperature. The glass transition temperature is identified, in accordance with DIN 53765, Section 8.1, as the temperature in the 2nd measurement run at which half of the change in specific heat capacity (0.5 delta $c_p$) is attained. It is determined from the DSC diagram (plot of the heat flow against the temperature), and is the temperature of the point of intersection of the middle line between the extrapolated base lines before and after the glass transition with the measurement curve.

The number-average and weight-average molecular weights are determined by gel permeation chromatography in accordance with DIN 55672-1 (2007-08 edition) for THF-soluble polymers using tetrahydrofuran (+0.1% acetic acid) as eluent on a styrene-divinylbenzene column combination (Waters HR4, HR3, HR2). Calibration takes place by means of polystyrene standards.

Preparation Example 1a

Synthesis of a Polyester Resin Solution with High Glass Transition Temperature Tg (A1)

A stirred tank atop which there is a column with phase separation vessel for recycling the azeotrope former is used in the first stage to synthesize, from 9.07% by weight of the neopentyl glycol ester of hydroxypivaloyl acid, 21.692% by weight of neopentyl glycol, 11.439% by weight of isophthalic acid and 11.043% by weight of tetrahydrophthalic anhydride, in the presence of 0.8% by weight of cyclohexane as azeotrope former, a polyester having an acid number to DIN EN ISO 3682 of 9.0 to 12.0 mg KOH/g and a viscosity of 390 to 450 mPas as a 70% dilution in butyl glycol. The shear rate of the viscometer is 10 000 $s^{-1}$. In the course of heating, care is taken to ensure that the column overhead temperature does not exceed 85° C.

The precursor thus obtained is reacted in a second stage with 6.735% by weight of trimellitic anhydride and 3.27% by weight of phthalic anhydride at 180° C. until the acid number is 22.0 to 25.0 mg KOH/g and a viscosity of a 60% dilution in butyl glycol is 700-1200 mPas.

The solid resin is dissolved as a melt in 21.273% by weight of naphthalene-depleted Solvesso 150, and diluted with 14.728% by weight of butyl glycol. The end product is adjusted with butyl glycol to an NVF of 59%-61% and a viscosity of 600 to 1000 mPas.

The binder (polyester A1) has a glass transition temperature of about +30° C., a number-average molecular weight (Mn) of 2110 g/mol and a weight-average molecular weight (Mw) of 5480 g/mol, and also a hydroxyl number of 96 mg KOH/g, based on the solids (nonvolatile fraction), which is determined after drying at 130° C. for 60 minutes.

Preparation Example 1b

Synthesis of a Polyester Resin Solution with High Glass Transition Temperature Tg and Excessive Acid Number A stirred tank atop which there is a column with phase separation vessel for recycling the azeotrope former is used in the first stage to synthesize, from 8.63% by weight of the neopentyl glycol ester of hydroxypivaloyl acid, 20.64% by weight of neopentyl glycol, 10.6% by weight of isophthalic acid and 10.51% by weight of tetrahydrophthalic anhydride, in the presence of 0.8% by weight of cyclohexane as azeotrope former, a polyester having an acid number to DIN EN ISO 3682 of 9.0 to 12.0 mg KOH/g and a viscosity of 390 to 450 mPas as a 70% dilution in butyl glycol. The shear rate of the viscometer is 10 000 $s^{-1}$. In the course of heating, care is taken to ensure that the column overhead temperature does not exceed 85° C.

The precursor we reacted in a second stage with 10.41% by weight of trimellitic anhydride at 180° C. until the acid number is 49.0 to 54.0 mg KOH/g and a viscosity of a 60% dilution in butyl glycol is 700-1200 mPas.

The solid resin is dissolved as a melt in 21.273% by weight of naphthalene-depleted Solvesso 150, and diluted with 14.728% by weight of butyl glycol. The end product is adjusted with butyl glycol to a nonvolatile fraction (NVF) of 59%-61% and a viscosity of 1000 to 1300 mPas.

The binder has a glass transition temperature of about +40° C., a number-average molecular weight (Mn) of 1440 g/mol and a weight-average molecular weight (Mw) of 4650 g/mol, and also a hydroxyl number of 98 mg KOH/g, based on the solids (nonvolatile fraction), which is determined after drying at 130° C. for 60 minutes.

Preparation Example 2

Synthesis of a Polyester Resin Solution with Low Glass Transition Temperature Tg (A2)

A stirred tank atop which there is a column with phase separation vessel for recycling the azeotrope former is used to synthesize, at 220° C., a polyester from 7.338% by weight of Pluriol BP40E (an ethoxylated derivative of bisphenol A, having on average four ethoxy groups, from BASF SE), 1.785% by weight of trimethylolpropane, 24.576% by weight of neopentyl glycol, 19.9% by weight of adipic acid and 5.912% by weight of trimellitic anhydride, in the presence of 0.7% by weight of cyclohexane as azeotrope former, until the acid number is 8-12 mg KOH/g and the viscosity is 620-720 mPas.

The solid resin is dissolved in 25.994 by weight of Solvesso 100 and diluted at below 100° C. with 6.45% by weight of butyl glycol acetate. The polyester solution is adjusted with Solvesso 100 to an NVF of 64%-66% and a viscosity of 1600-2100 mPas, measured with a viscometer shear rate of 2500 $s^{-1}$.

The glass transition temperature is about −15° C. The number-average molecular weight (Mn) is 2730 g/mol. The weight-average molecular weight (Mw) is 22 000 g/mol.

The hydroxyl number is 84 mg KOH/g, based on the solids (nonvolatile fraction), which is determined after drying at 130° C. for 60 minutes.

Coating Materials: Inventive Example 1, Inventive Example 2 and Comparative Examples C1 and C2

Two coating materials (F) which meet the criteria of the invention (inventive example 1, inventive example 2), and also two non-inventive coating materials (comparative examples C1 and C2) are prepared in accordance with the table below:

|  | Comparative example C1 | Inventive example 1 | Inventive example 2 | Comparative example C2 |
|---|---|---|---|---|
| Polyester from preparation example 2 | 14.00 | 14.00 | 14.00 | 14.00 |
| Epoxy resin solution | 3.00 | 3.00 | 3.00 | 3.00 |
| Rheological additive | 3.50 | 3.50 | 3.50 | 3.50 |
| Dispersing assistant | 0.10 | 0.10 | 0.10 | 0.10 |
| Aerosil R 972 | 0.26 | 0.26 | 0.26 | 0.26 |
| Lamp black | 0.10 | 0.10 | 0.10 | 0.10 |
| Titanium rutile R-706 | 7.00 | 7.00 | 7.00 | 7.00 |
| Blanc Fixe Micro | 18.00 | 18.00 | 20.00 | 20.00 |
| Butyl glycol acetate | 5.30 | 5.30 | 5.30 | 5.30 |

The mill base is weighed out in the order given above and subjected to preliminary dispersing for 180 minutes by means of a suitable dissolver. This is followed by dispersion on an agitator mill which is suitable for the batch size. Grinding media: 0.6-0.8 mm Jyoti, fill level 80%. The mill base temperature is to be within the range from 50 to 70° C. (adapt via throughput and cooling). The intention is to introduce an energy input of at least 0.10 kWh per kg of mill base, and a fineness of 12 to 15 micrometers (Hegmann wedge to 25 micrometers) is to be achieved. In a final passage through the mill, the mill base is discharged via filters (Pong 10 micrometers) into the make-up mixer.

Making up is carried out as follows:

|  | Comparative example C1 | Inventive example 1 | Inventive example 2 | Comparative example C2 |
|---|---|---|---|---|
| Polyester from preparation example 2 | 16.00 | — | — | — |
| Polyester from preparation example 1a | — | 16.00 | 17.00 | — |
| Polyester from preparation example 1b | — | — | — | 17.00 |
| Epoxy resin solution | 4.00 | 4.00 | 8.50 | 8.50 |
| Desmodur BL 4265, 65% SN | 2.50 | 2.50 | 4.50 | 4.50 |
| Desmodur BL 3175, 75% SN | 8.00 | 8.00 | 4.00 | 4.00 |
| Luwipal B 017, 86% B | 3.00 | 3.00 | 2.50 | 2.50 |
| Luwipal 018 BX, 70% B/X | 3.00 | 3.00 | — | — |
| Resimene HM 2608, 90% IB | — | — | 3.00 | 3.00 |
| Flow control agent 1 (1% strength silicone oil solution) | 0.10 | 0.10 | 0.10 | 0.10 |
| Flow control agent 2 (10% strength polyacrylate solution) | 0.30 | 0.30 | 0.30 | 0.30 |
| Butanol | 1.00 | 1.00 | 2.00 | 2.00 |
| Butyl diglycol acetate | — | — | 1.00 | 1.00 |
| Butyl acetate 98-100% | — | — | 3.00 | 3.00 |
| Solvent naphtha 160/180 | 8.84 | 8.84 | 0.84 | 0.84 |
| Xylene | 2.00 | 2.00 | — | — |

Filtration through needle felt pouches 150/25/10 micrometers

| Total | 100.00 | 100.00 | 100.00 | 100.00 |

Figures are in parts by weight in each case. The epoxy resin solution is a 60% dilution of an epoxy resin having an epoxide equivalent weight of between 475 and 505 g/mol in a mixture of xylene and butyl glycol acetate in a ratio of 3:1.

The glass transition temperatures Tg of the coating materials were as follows:

|  | Comparative example C1 | Inventive example 1 | Inventive example 2 | Comparative example C2 |
|---|---|---|---|---|
| Tg | 35° C. | 43° C. | 58° C. | 58° C. |

Shelf Life of the Coating Materials from Examples 1, 2, C1 and C2

The shelf life of the coating materials prepared was determined by comparing a) the initial viscosity immediately after preparation of the coating material with b) the final viscosity after 4-week storage at 40° C. The viscosity is measured using an Afnor flow cup (4 mm) at 23° C. (reported in seconds).

The initial and final viscosities of the coating materials were as follows:

|  | Comparative example C1 | Inventive example 1 | Inventive example 2 | Comparative example C2 |
|---|---|---|---|---|
| Initial viscosity after preparation [s] | 60.0 | 61.0 | 60.0 | 59.0 |
| Final viscosity after 4 weeks at 40° C. [s] | 74.0 | 95.0 | 98.0 | 150.0 |

The coating materials from inventive examples 1 and 2 have a significantly better shelf life as compared with comparative example C2.

Production of Multicoat Coatings

Multicoat coatings are produced as follows from the coating materials of inventive example 1, inventive example 2, comparative example C1 and comparative example C2:

The coating material as per inventive example 1, inventive example 2, comparative example 1 or comparative example 2 is applied to an electrocoated (Cathoguard® 500) metal substrate by spraying in each case in a dry film thickness of 45 micrometers, then flashed at 20° C. for 5 minutes and cured at 30° C. for 150 minutes, after which a commercial waterborne basecoat and a commercial one-component clearcoat are applied as further coats (60-65 micrometers), followed by joint curing at 130° C. for 30 minutes. The coating system was then subjected to a weathering test using a Xenotest 1200 CPS instrument from Atlas in accordance with a customer specification, at 50±3° C. and elevated humidity, and with UV irradiation using a xenon lamp (290 nm, 60±3 W/m²).

Properties of the Multicoat Coatings

1) Bird-Dropping Resistance According to a Customer Specification

The test material applied to the multicoat coatings obtained after weathering is a solution of gum arabic (50% in deionized water), with application taking place to at least 3 measurement sites each with a diameter of 2 cm, the amount of gum arabic solution applied being 3 drops per measurement site, followed by drying at room temperature for 30 minutes.

The paint systems prepared in this way are incubated in an oven at 60° C. for 3 days. The gum arabic solution is then removed under running water at 60-65° C., and the paint system is left to dry at room temperature for 30 minutes.

The adhesion of the paint coats is verified subsequently by adhesive tape removal. This is done by pressing a piece of adhesive tape (e.g. Tesafilm) onto the measurement site, and pulling it off again with a rapid movement.

Evaluation takes place visually in accordance with the following criteria:
0=no defects
1=small cracks
2=cracks and slight loss of adhesion
3=cracks and loss of adhesion
4=severe loss of adhesion
5=extremely severe loss of adhesion.

An average value is formed from all of the measurement sites on a paint system.

2) Micropenetration Hardness

After the weathering, the micropenetration hardness (universal hardness; Martens hardness) was determined at 25.6 mN in accordance with DIN EN ISO 14577.

3) Stonechip Resistance

After the weathering, the stonechip resistance was determined in accordance with a customer specification (multistone impact with 2×500 g at 2 bar; subsequent adhesive tape removal). Assessment is made visually by size and number of damage sites, and is reported using ratings on a scale from 0 (no damage sites) to 8 (very numerous, large damage sites).

The results for the multicoat coatings were as follows:

|  | Comparative example C1 | Inventive example 1 | Inventive example 2 | Comparative example C2 |
|---|---|---|---|---|
| Bird-dropping resistance | 2.0 | 1.5 | 1.2 | 1.2 |
| Micropenetration hardness [N/mm²] | 145 | 222 | 262 | 251 |
| Stonechip resistance | 2.0 | 2.0 | 2.0 | 2.0 |

The results obtained show clearly that the multicoat coatings of the invention (produced using the coating materials from inventive examples 1 and 2) exhibit, by comparison with comparative example C1, improved micropenetration hardness and improved bird-dropping resistance, with no loss of stonechip resistance.

The invention claimed is:

1. A method for producing a multicoat coating comprising:
   (i) applying a primer-surfacer coat (I) to an optionally pretreated substrate,
   (ii) curing the primer-surfacer coat (I),
   (iii) applying a basecoat (II) to the cured primer-surfacer coat (I),
   (iv) optionally curing the basecoat (II),
   (v) applying a clearcoat (III) to the cured or uncured basecoat (II), and
   (vi) curing the clearcoat (III) or the basecoat and the clearcoat if the basecoat was not cured in step (iv),
   wherein the primer-surfacer coat (I) is obtained by applying a nonaqueous, solventborne coating material (F) comprising:
   at least 20% by weight, based on the total coating material (F), of at least one organic solvent, and also
   (A1) from 9% to below 30% by weight, based on the total coating material (F), of at least one first polyester (A1), having a glass transition temperature of at least 20° C. and an acid number of 0 to 40 mg KOH/g,
   (A2) from 9% to below 30% by weight, based on the total coating material (F), of at least one second polyester (A2), different from (A1) and having a glass transition temperature of not more than 10° C. and an acid number of 5 to 50 mg KOH/g,
   (B) at least one crosslinker (B), and
   (C) at least 8% by weight, based on the total coating material (F), of one or more fillers and/or pigments (C);
   wherein the nonaqueous, solventborne coating material (F) is storage-stable wherein on storage at 40° C. for four weeks, viscosity of (F) measured at 23° C. is not more than twice the viscosity of (F) immediately after preparation;
   wherein the coating material (F) has a weight ratio of polyester (A1) to polyester (A2) of 0.7 to 1.2; and
   wherein the coating material (F) further comprises an epoxy resin and wherein (A1) is obtained from the reaction of: neopentyl glycol ester of hydroxypivaloyl acid, neopentyl glycol, isophthalic acid or anhydride, and tetrahydrophthalic acid or anhydride, and subsequent reaction with: trimellitic acid or anhydride, and phthalic acid or anhydride; and (A2) is obtained from the reaction of: ethoxylated bisphenol A derivative, neopentyl glycol, and trimethylolpropane with: adipic acid, and trimellitic acid or anhydride.

2. The method according to claim 1, wherein the optionally pretreated substrate is a metallic substrate.

3. The method according to claim 1, wherein the optionally pretreated substrate is an automobile body or a part thereof.

4. A multicoat coating obtainable by the method according to claim 1.

5. The multicoat coating according to claim 4, wherein the glass transition temperature of the coating material (F) is at least 35° C.

6. The multicoat coating according to claim 4, wherein the polyester (A1) has an acid number of 0 to 30 mg KOH/g.

7. The multicoat coating according to claim 4, wherein the polydispersity (Mw/Mn) of the first polyester (A1) is 5 or below, and the polydispersity (Mw/Mn) of the second polyester (A2) is 5 or above.

8. The multicoat coating according to claim 4, wherein the crosslinker or crosslinkers (B) are selected from the group consisting of blocked polyisocyanates, melamine-formaldehyde resins and benzoguanamine-formaldehyde resins.

9. The multicoat coating according to claim 4, wherein the coating material (F) comprises at least one blocked isocyanate and at least one amino resin as crosslinker (B).

10. The multicoat coating according to claim 4, wherein the coating material (F) has a weight ratio of fillers and/or pigments (C) to binders (A1+A2+B) of (C):(A1+A2+B)=0.5 to 1.2.

11. The multicoat coating according to claim 4, wherein the filler or fillers and/or pigment or pigments (C) are selected from the group consisting of silicates, calcium carbonates, calcium magnesium carbonates, barium carbonate, carbon black, barium sulfates, calcium sulfate, aluminum hydroxide, magnesium hydroxide, titanium dioxide and silicas.

12. A substrate coated with the multicoat coating according to claim 4.

13. The substrate according to claim 12 that a metallic substrate.

14. The substrate according to claim 13 that is an automobile body or part thereof.

15. The method according to claim 1, wherein the at least one crosslinker (B) is selected from the group consisting of a blocked isocyanate and an amino resin.

16. The method according to claim 1, wherein (iii) comprises applying the basecoat (II) directly to the cured primer-surfacer coat (I).

17. The method according to claim 1, wherein the at least one first polyester (A1) is present in an amount of from 10% to below 30% by weight.

18. A method for producing a multicoat coating comprising:
  (i) applying a primer-surfacer coat (I) to an optionally pretreated substrate,
  (ii) curing the primer-surfacer coat (I),
  (iii) applying a basecoat (II) to the cured primer-surfacer coat (I),
  (iv) optionally curing the basecoat (II),
  (v) applying a clearcoat (III) to the cured or uncured basecoat (II), and
  (vi) curing the clearcoat (III) or the basecoat and the clearcoat if the basecoat was not cured in step (iv),
  wherein the primer-surfacer coat (I) is obtained by applying a nonaqueous, solventborne coating material (F) comprising:
at least 20% by weight, based on the total coating material (F), of at least one organic solvent, and also
(A1) from 9% to below 30% by weight, based on the total coating material (F), of a first polyester (A1), having a glass transition temperature of at least 20° C. and an acid number of 0 to 40 mg KOH/g, the first polyester (A1) obtained from the reaction of: neopentyl glycol ester of hydroxypivaloyl acid, neopentyl glycol, isophthalic acid, and tetrahydrophthalic anhydride, and subsequent reaction with trimellitic anhydride and phthalic anhydride;
(A2) from 9% to below 30% by weight, based on the total coating material (F), of a second polyester (A2), different from (A1) and having a glass transition temperature of not more than 10° C. and an acid number of 5 to 50 mg KOH/g, the second polyester (A2) obtained from the reaction of: ethoxylated bisphenol A derivative, neopentyl glycol, and trimethylolpropane with: adipic acid and trimellitic anhydride;
(B) at least one crosslinker (B) selected from the group consisting of blocked polyisocyanates and melamine-formaldehyde resins, and
(C) at least 8% by weight, based on the total coating material (F), of one or more fillers and/or pigments (C);
  wherein the coating material (F) has a weight ratio of polyester (A1) to polyester (A2) of 0.9 to 1.2.

19. The method of claim 18, wherein the coating material (F) further comprises an epoxy resin.

20. The method of claim 18, wherein the at least one first polyester (A1) is present in an amount of from 10% to below 30% by weight.

* * * * *